March 24, 1953 E. J. KALAT 2,632,343
BORING, FACING, AND RECESSING TOOL
Filed March 9, 1949 2 SHEETS—SHEET 1

INVENTOR
ELMER J. KALAT
BY
Richey Watts
ATTORNEYS

March 24, 1953  E. J. KALAT  2,632,343
BORING, FACING, AND RECESSING TOOL
Filed March 9, 1949  2 SHEETS—SHEET 2

INVENTOR.
ELMER J. KALAT
BY
Richey & Watts
ATTORNEYS

Patented Mar. 24, 1953

2,632,343

UNITED STATES PATENT OFFICE 2,632,343

BORING, FACING, AND RECESSING TOOL

Elmer J. Kalat, Cleveland, Ohio, assignor to The Maxwell Company, Bedford, Ohio, a corporation Application March 9, 1949, Serial No. 80,529

4 Claims. (Cl. 77—58)

This invention relates to metal-turning tools, and is especially adapted for boring, counter-boring, recessing, and facing. The invention preferably finds embodiment in an adjustable tool holder adapted for mounting in a rotatable spindle of a machine tool. The tool holder may be fed into a work piece along the axis of the spindle either by movement of the spindle or of the work piece, and may be fed radially with respect to the axis, while stationary or moving, by an adjustment of the tool holder. It will, of course, be understood that the tool may be mounted in a non-rotating holder such as a lathe turret where means is provided for rotating the work piece. The invention provides accurate and easily adjustable means for boring straight or tapered holes and for performing countersinking, recessing, or facing operations.

A feature of the invention lies in the provision of novel gearing by which the tool may be fed radially a very small amount for each revolution of the body of the tool holder, and may be adjusted with precision when the tool holder is revolving or stationary.

Objects of the invention are to provide an improved boring and recessing tool; to provide such a tool in which the radius of the cut may be easily and precisely adjusted; and to provide gearing producing a very great reduction in movement with substantially no lost motion and a minimum of friction.

Other objects and advantages of the invention, more or less ancillary, will be apparent to those skilled in the art from the description herein of the preferred embodiment of the invention in which.

Figures 1, 2:
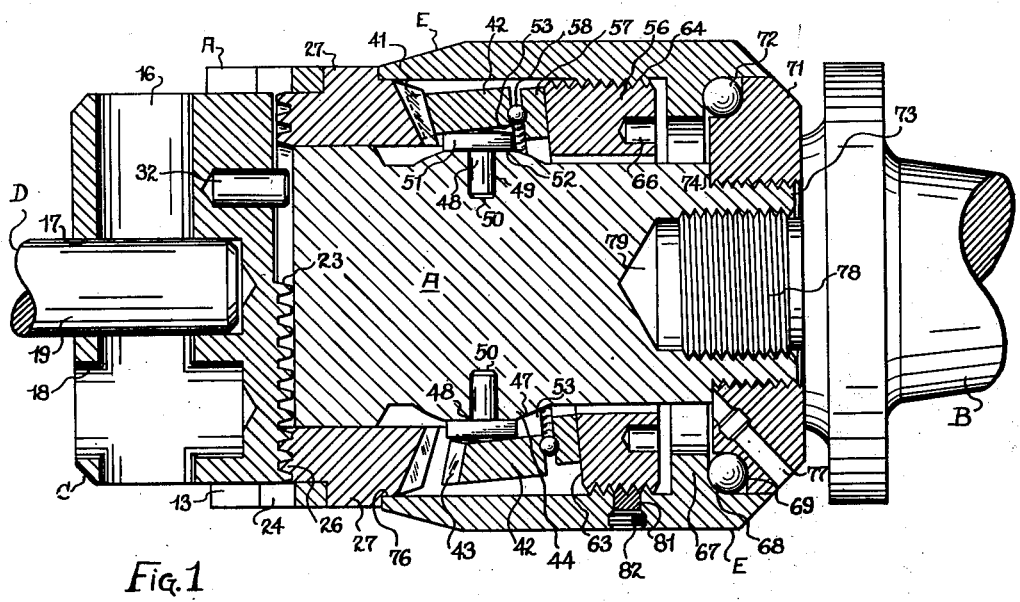
Fig. 1 is a longitudinal section of a tool according to the invention.
Fig. 2 is a view partly in longitudinal section, and partly in profile with the adjusting collar cut away.
Figure 3:
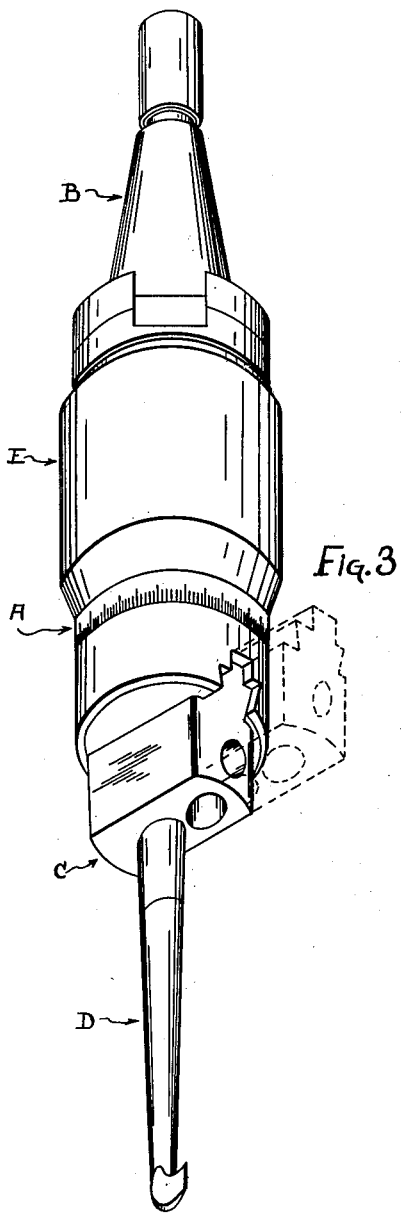
Fig. 3 is a perspective view.

The general appearance of the tool may be seen from Fig. 3. It comprises a body A to which is fixed a shank B, which may be of any type, such as a standard taper shank, and a tool block C slidable in the body transversely of the axis of the shank B. A cutting tool D may be mounted in the tool block C, as will be explained more fully. The tool block is adjusted by rotation of a collar E relative to the body through mechanism which is not visible in Fig. 3. With reference to Figs. 1 and 2, the body A is generally a surface of revolution about the axis of the shank B. The end face 11 of the body remote from the shank is machined flat to provide a bearing for the undersurface 12 of the tool block C. A diametral dovetail groove 13 is machined in the body A to receive a dovetail tenon 14 formed on the tool block.

Figure 4:
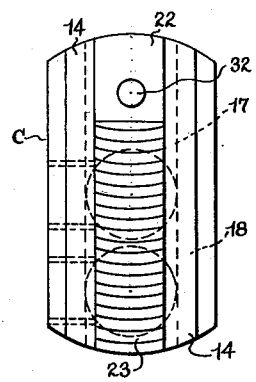
Figs. 4 and 5 are detail views of the tool block.
Figure 5:
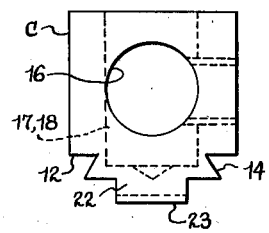

The tool block C is of generally rectangular form and may be adapted in any desired manner for the mounting of cutting tools, the preferred arrangement being provided by boring a hole 16 longitudinally of the block, that is, parallel to its axis of reciprocation, and two additional holes 17 and 18 parallel to the axis of the spindle B with their axes intersecting the axis of the bore 16. Cutting tools, such as the tool D, the shank 19 of which is shown in Figs. 1 and 2, may be retained in any of the bores by set screws 21 threaded into the tool block at the intersections of the bores 16, 17, and 18. The tool block is formed with a longitudinal rib 22 on which are formed scroll teeth 23 in the form of a rack with arcuate teeth (see Fig. 4). A slot 24 in the body provides clearance for the rib 22 and teeth 23.

Figure 6:
Figs. 6 and 7 are enlarged views of the tool block gib.
Figure 7:
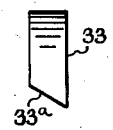

The teeth 23 engage a scroll 26 formed on the face of a ring 27 rotatable on the body. The tooth form is preferably that of the Acme thread. The end of the body in which the tool block slides is of considerably larger diameter than the rest of the body, and the scroll portion of the ring 27 rotates within an annular groove 28 in the rear face of the enlarged portion of the body. This groove 28 cuts into the transverse slot 24 so that the teeth 23 and 26 may engage. A shoulder 31 of the ring 27 engages a face of the body to insure proper clearance of the scroll teeth and to prevent jamming due to pressure. A stop pin 32 forced into the tool block C limits inward movement of the tool block by engagement with the scroll so as to prevent disengagement of the scroll teeth. A gib 33 (Figs. 6 and 7), which may be machined from a Woodruff key, is mounted in an arcuate slot cut into the wall of the dovetail groove 13. The face 33a of the gib is urged against the tenon 14 by a set screw 34.

Rotation of the scroll ring 27 about the axis of the body will cause transverse movement of the tool block C and corresponding feeding movement of a cutting tool mounted in the block. The ring 27 is rotated by rotation of the collar E relative to the body A. The face of the ring 27 opposite the scroll is provided with gear teeth 41 which may have the usual form of bevel gear teeth. A ring gear 42 formed with bevel gear teeth 43 meshes with the gear teeth 41, the ring 42 being preferably provided with one more or one less tooth than ring 27. The body A is formed with a spherical enlargement 44 on which the gear 42 is mounted. The inner surface of gear 42 comprises a cylindrical portion 46 adjacent the teeth 41 and a spherical portion 47 dimensioned to fit the spherical portion of the body. As will be apparent, this ball and socket mounting of the ring gear on the body permits it to oscillate about the geometrical center of the spherical portion of the body.

Means are provided to prevent relative rotation of the ring gear 42 to the body while permitting this oscillatory movement. In the preferred form, this means comprises swivel keys 48 (Fig. 1) each having a cylindrical stem 49 rotatable in a radial bore 50 of the body, the axis of the bore being perpendicular to the axis of the body and radial to the spherical portion 44. The head 51 of the key is rectangular and abuts a faced-off surface 52 of the body about the mouth of the bore 50. The heads 51 of the keys 48 are received in slots 53 in the ring gear 42, the slots being generally parallel to the axis of the ring gear. Thus, oscillation of the ring gear 42 about the axis of the bores 50 is permitted by rotation of the keys 48 and oscillation about an axis perpendicular thereto and perpendicular to the axis of the body is permitted by sliding movement of the gear over the heads of the keys.

Oscillation of the ring gear 42 is effected by the collar E through a skew ring cam 56 adjustably mounted therein, a thrust bearing race 57, and a set of bearing balls 58 interposed between the bearing 57 and the ring gear 42. The thrust bearing 57 is a simple ring with a bearing race 61 formed in one face complementary to a bearing race 62 in the ring gear 42. The flat face of the ring 57 engages the front face 63 of the skew ring 56 which is a plane face oblique to the axis of the body and the ring. The skew ring 56 is formed with a threaded outer surface by which it is mounted in an internally threaded portion 64 of the collar E, adjustment being facilitated by holes 66 in the ring for the reception of a spanner wrench or the like.

The collar E is of generally cylindrical form and of considerable axial extent so that it encloses and protects the operating mechanism. The collar E has an inwardly directed flange 67, a face of which is formed to provide a bearing race 68 between which and the bearing race 69 formed on a retaining nut 71 bearing balls 72 are provided. The retaining nut 71 is threaded onto an externally threaded reduced end portion 73 of the body into engagement with a shoulder 74. The ball bearings 72 absorb the longitudinal thrust on the collar E and provide for free rotation of the collar. These form the principal bearing for the collar, although the opposite end of the collar E is located by a plain radial and thrust bearing at 76 on the scroll 27. An oil hole 77 may be provided in the retaining ring 71.

Preferably the shank B is formed with a threaded end portion 78 received in an internally threaded bore 79 in the end of the body, the shank being formed with a face which screws down again the retaining ring 71. The skew ring 56 is prevented from rotating in the collar E by a plug 81 compressed by a set screw 82 threaded into the collar. The ring may be adjusted to secure the desired operating clearance and properly retain the ring gear on the spherical portion of the body.

The operation of the mechanism may be most easily understood by assuming that the body A is stationary and the collar E is rotated, rotating with it the skew ring 56 fixed to the collar. This rotation of the ring 56 causes oscillation of the thrust bearing member 57 and ring gear 42 about the center of the spherical zone 44 of the body. Because of the bearing balls 58, the ring 57 will rotate with the ring 56. The thrust bearing 57 is self-aligning with the ring 42. The teeth 43 will be in engagement with the teeth 41 at that point of the circumference of the ring 42 which is opposite the thick portion of the ring 56, as in the upper part of Fig. 2. At the opposite point of the circumference of the two gears the teeth will be out of mesh, as indicated at the lower side of Fig. 1 and at the axis of Fig. 2. The oscillating movement due to rotation of the collar E causes the ring gear 42 to roll around on the teeth 41 of the scroll ring 27. If these two gears had the same number of teeth, this rolling would take place with no movement of the gear 27. If the teeth 43 exceed in number the teeth 41, as each tooth 43 is forced into engagement with a tooth of the ring 27, the ring 27 will be crowded ahead in the same direction as the rotation of the point of engagement of the two gear surfaces. If the gear 42 has one more tooth than the ring 27, the ring will be moved ahead one tooth for each complete oscillation of the ring 42. Thus, for example, if there are forty teeth on the ring 27 and forty-one teeth on the ring gear 42, the oscillation of the ring gear corresponding to one complete rotation of the collar E will advance the scroll ring one-fortieth of a revolution. If the pitch of the scroll teeth 26 and 23 is one-tenth inch, the tool block C will be moved 1/400 inch for each rotation of the collar E. It is to be understood that these numerical values are purely illustrative, but they may be taken as indicative of a desirable set of values which would be convenient in many cases in shop practice.

If the device is mounted in a rotating spindle, such as in a boring machine, the tool 19 may be fed into the work along the axis of the spindle by axial movement of the spindle or by corresponding movement of the work piece, and the tool may be rotated for cutting by rotation of the spindle. This rotation of the spindle does not affect the radial position of the tool block C since the scroll gearing is irreversible. The tool may be adjusted to any desired cutting radius by rotation of the collar E. In view of the extremely great reduction in movement between the collar and the tool block, it will often be found most convenient to effect a rough adjustment by holding the collar E in the hand while rotating the spindle and the body A by power. If it is desired to perform a counterboring, facing, or recessing operation in which the tool 19 is to be fed radially outward from the axis of rotation, this operation may be effected by holding the collar E against movement while the body is rotated. In the example given above, this would cause a radial tool feed of 1/400 inch for each rotation of the tool.

The instrument is well adapted to the provision of micrometric scales to facilitate setting or adjustment of the boring tool. Since one rotation of the ring 27 advances the tool block one-tenth inch, graduations 86, preferably one hundred in number, may be placed around the outer circumference of the ring, preferably cooperating with ten equally spaced index marks 87 on the exposed portion of the body. Each graduation 86 will represent a feed of 1/1000 inch. Still finer adjustment may be facilitated by the provision of graduations on the end face 88 of the collar, which may cooperate with an index or indices 89 on the bevelled face of the retaining nut 71. With the numerical example stated above, there may conveniently be twenty-five graduations on the collar E. Since one rotation of the collar advances the tool 1/400 inch, each graduation will correspond to an adjustment of 1/10,000 inch.

Conical boring operations may be performed by feeding the entire tool forward while holding the collar E against rotation, the amount of taper being determined by the forward feed per rotation, since the radial feed is fixed by the design of the tool.

The direction of feed of the tool block C for a given direction of rotation of the body A with respect to the collar E is determined by the hand of the scroll thread 26 and by whether the gear 42 has more or fewer teeth than the ring 27. The tool may thus obviously be arranged for movement in either direction. If desired, a number of ring gears 42 may be supplied to provide for different rates of feed, or different directions of feed, or both.

The gear 42 and ring 27 are provided with bevel gear teeth the conical pitch surfaces of which have their apices located at the center of oscillation of the gear 42. This construction is desirable to ensure free and smooth operation of the gearing.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

I claim:

1. A metal turning tool comprising a longitudinal body having a shank end and a tool end, a transverse recess in the tool end of said body, a tool holder comprising a body having a projection along one end thereof, the projection being fitted into the recess for sliding engagement with the tool body and the projection having teeth along the end adjacent the tool body, a first annular member mounted for rotation on the tool body and having teeth at the tool end thereof engaging the teeth in the tool holder for shifting the tool holder laterally upon rotation of the annular member, and bevel gear teeth at the shank end thereof, a spherical segment formed in the tool body adjacent the shank end of the annular member, pivot members comprising pins having cylindrical heads positioned adjacent the crest of the spherical segment and collinear with the center thereof, a second annular member having a spherical inner surface fitted over the spherical segment, longitudinal grooves receiving the pivot members, and teeth at the tool end of the member engaging the teeth of the first annular member along one portion of the circumference thereof, the number of teeth of the second annular member being slightly different from the number of engaging teeth of the first annular member, a third annular member mounted for rotation upon the tool body at the shank end thereof, the tool end portion of the last named member being skewed with respect to the longitudinal axis of the tool body and operatively connected to the second annular member.

2. A metal turning tool comprising a longitudinal body having a shank end and a tool end, a transverse recess in the tool end of said body, a tool holder comprising a body in sliding engagement with the tool body and having teeth along the end adjacent the tool body, a first annular member mounted for rotation on the tool body and having teeth at the tool end thereof engaging the teeth in the tool holder for shifting the tool holder laterally upon rotation of the annular member, and gear teeth at the shank end thereof, a spherical segment formed in the tool body adjacent the shank end of the annular member, pivot members comprising pins positioned on the spherical segment, a second annular member having a spherical inner surface fitted over the spherical segment, longitudinal grooves receiving the pivot members, and teeth at the tool end of the member engaging the teeth of the first annular member along one portion of the circumference thereof, the number of teeth of the second annular member being slightly different from the number of engaging teeth of the first annular member, a third annular member mounted for rotation upon the tool body at the shank end thereof, the tool end portion of the last named member being skewed with respect to the longitudinal axis of the tool body and operatively connected to the second annular member.

3. A metal turning tool comprising a longitudinal body having a shank end and a tool end, a transverse recess in the tool end of said body, a tool holder comprising a body in sliding engagement with the tool body and having teeth along the end adjacent the tool body, a first annular member mounted for rotation on the tool body and having teeth at the tool end thereof engaging the teeth in the tool holder for shifting the tool holder laterally upon rotation of the annular member, and gear teeth at the shank end of the said annular member, a second annular member mounted for limited spherical motion relative to a fixed point on the longitudinal axis of the body forward of the first member and having teeth at the tool end of the member engaging the teeth of the first annular member along one portion of the circumference thereof, the number of teeth of the second annular member being slightly different from the number of teeth of the first annular member, a third annular member mounted on the tool body at the shank end thereof for rotation about the longitudinal axis of the body, the tool end portion of the last named member being skewed with respect to the longitudinal axis of the tool body and operatively connected with the second annular member.

4. In a tool, a longitudinal body having a shank end and a tool end, a first annular member mounted for rotation on the tool body and having gear teeth at the shank end thereof, a spherical segment formed in the tool body adjacent the shank end of the annular member, pivot members comprising pins having cylindrical heads positioned at the crest of the spherical segment and collinear with the center thereof, a second annular member having a spherical inner surface fitted over the spherical segment, and having longitudinal grooves receiving the pivot members, and having teeth at the tool end of the member engaging the teeth of the first annular member along one portion of the circumference thereof, the number of teeth of the second annular member being slightly different from the number of teeth of the first annular member, a third annular member mounted for rotation upon the tool body at the shank end thereof, the tool end portion of the last named member being skewed with respect to the longitudinal axis of the tool body and operatively connected with the second annular member.

ELMER J. KALAT.

REFERENCES CITED

The following references are of record in the file of this patent:

UNITED STATES PATENTS

| Number | Name | Date |
|---|---|---|
| 9,914 | Dibben et al. | Aug. 9, 1853 |
| 120,940 | Cherry | Nov. 14, 1871 |
| 1,361,686 | Conwell | Dec. 7, 1920 |
| 1,616,369 | Hartmann | Feb. 1, 1927 |

FOREIGN PATENTS

| Number | Country | Date |
|---|---|---|
| 365,488 | Germany | Dec. 15, 1922 |
| 549,904 | Germany | May 6, 1932 |